US006798532B1

(12) United States Patent
Okino

(10) Patent No.: US 6,798,532 B1
(45) Date of Patent: Sep. 28, 2004

(54) PHOTOGRAPH PRINTING AND DELIVERING METHOD, CAMERA TO BE USED IN THIS METHOD AND PHOTOGRAPH PRINTING AND DELIVERING SYSTEM

(76) Inventor: Hiroo Okino, 49-5, Senriyama-higashi 4-chome, Suita-shi, Osaka (JP), 565-0842

( * ) Notice: Subject to any disclaimer, the term of this patent is extended or adjusted under 35 U.S.C. 154(b) by 0 days.

(21) Appl. No.: 09/564,354

(22) Filed: May 1, 2000

(30) Foreign Application Priority Data

Feb. 9, 2000 (JP) ........................................ 2000-032244

(51) Int. Cl.7 .......................... G06K 15/00; G06F 13/00
(52) U.S. Cl. ................. 358/1.15; 358/302; 348/207.99; 348/207.1; 348/207.11; 348/207.2
(58) Field of Search ................ 358/1.1–1.9, 1.11–1.18, 358/450, 452, 302; 355/40; 399/137, 145; 709/200, 201, 217, 219, 229; 705/26, 27; 348/207.99, 207.2, 207.1, 207.11

(56) References Cited

U.S. PATENT DOCUMENTS

| 5,737,491 | A | * | 4/1998 | Allen et al. ................. 704/270 |
| 6,324,521 | B1 | * | 11/2001 | Shiota et al. ................. 705/27 |
| 6,628,325 | B1 | * | 9/2003 | Steinberg et al. ......... 348/211.1 |

FOREIGN PATENT DOCUMENTS

| JP | 08-204703 | 8/1996 |
| JP | 10-78618 | 3/1998 |
| JP | 10-078620 | 3/1998 |
| JP | 2000-514582 | 4/1998 |
| JP | 10-326244 | 12/1998 |
| JP | 10-336574 | 12/1998 |
| JP | 11-154218 | 6/1999 |
| JP | 11-168684 | 6/1999 |
| JP | 11-205503 | 7/1999 |
| JP | 11-261706 | 9/1999 |
| JP | 2000-022823 | 1/2000 |

OTHER PUBLICATIONS

Yoshida, Shigeo, et al. "Network Digital Camera". Journal of the Institute of Image Electronics Engineers of Japan, 1999. pp 234–239, vol. 28, No. 3.

* cited by examiner

Primary Examiner—King Y. Poon
(74) Attorney, Agent, or Firm—SoCal IP Law Group; Steven C Sereboff; Joel G Landan

(57) ABSTRACT

A photograph printing and delivering method and system do not require external equipment, such as personal computer or the like and permits delivery of the printed products to a user of the camera. The method and system performs receiving an image data transmitted from a camera through a mobile communication network, obtaining identification of a caller transmitting the image data, performing printing for reproducing an image on the basis of the received image data, obtaining information of delivery destination, to which a printed product is to be delivered, on the basis of the caller identification, and shipping the printed product to the delivery destination based on the delivery destination information.

9 Claims, 3 Drawing Sheets

PHOTOGRAPH PRINTING AND DELIVERING METHOD, CAMERA TO BE USED IN THIS METHOD AND PHOTOGRAPH PRINTING AND DELIVERING SYSTEM

BACKGROUND OF THE INVENTION

1. Field of the Invention

The present invention relates generally to a photograph printing and delivering method and a photograph printing and delivering system. More particularly, the invention relates to a photograph printing and delivering method and a photograph printing and delivering system for receiving a photographic image data transmitted from a camera, printing a photograph on the basis of the photographic image data and delivering the printed photograph. The present invention also relates to a camera to be used for the photograph printing and delivering method.

2. Description of the Related Art

When a silver film, on which photographic images are picked up by a camera, is desired to be developed, it is a typical custom that the exposed film has to be brought to a shop providing development and printing services, such as photograph processing laboratory and so forth, and after the photographs are developed and printed, a developed negative film and printed photographs are picked up from the development and printing service shop. Therefore, one desiring development and printing picked up photographic images (hereinafter referred to as ("user"), has to visit the development and printing service shop, twice. This should be troublesome for the user. In contrast to this, with digital cameras spreading abruptly in the recent years, the picked-up images can be instantly seen on display screens on the digital cameras per se or of a personal computer, television set or so forth. Additionally, the picked up image can be printed by a color printer.

However, typical color printers currently being spread is low in quality of the printed images in comparison with image quality to be achieved by the photographs obtained from development of the exposed silver film. While high quality color printers are available, such printers are too expensive to purchase for personal use. For this reason, increased number of photograph developing and printing service shops are starting additional printing service for providing high quality print of the photographic image data of the digital camera. However, even in this case, the user has to visit the service shop twice for transferring data on one hand and for picking up the printed products on the other hand.

On the other hand, Japanese Laid-Open Patent Publication No.10-78618 discloses a system for transmitting a digital image data from a personal computer to a printing service provider, and delivering the printed products from the printing service provider to the user. In the proposed system, it becomes unnecessary for the user to visit the service shop. However, the image data picked up by the digital camera has to be once transferred to the personal computer for transmitting to the printing service provider. Therefore, the image data picked up while traveling cannot be transferred to the printing service provider unless the personal computer is brought together with the digital camera or until the user returns to the site where the personal computer is placed, such as own home or so forth. Furthermore, for some types of users who are not so familiar with personal computer, it should be troublesome work for transferring data from the camera to the personal computer and from the personal computer to the printing service provider.

SUMMARY OF THE INVENTION

The present invention has been worked out in view of the inconvenience or shortcoming in the current status of art. It is therefore an object of the present invention to provide a photograph printing and delivering system, a photograph printing and delivering method and a camera to be used in the photograph printing and delivering method, which does not require external equipment, such as personal computer or the like and permits delivery of the printed products to a user of the camera.

According to the first aspect of the present invention, a photograph printing and delivering method comprises:

- data receiving step of receiving an image data transmitted from a camera through a mobile communication network;
- caller ID obtaining step of obtaining identification of a caller transmitting the image data;
- image printing step of performing printing for reproducing an image on the basis of the received image data;
- delivery destination information obtaining step of obtaining information of delivery destination, to which a printed product is to be delivered, on the basis of the caller identification; and
- shipping step of shipping the printed product to the delivery destination based on the delivery destination information.

According to the second aspect of the present invention, a photograph printing and delivering method comprises:

- data transmission step of transmitting an image data representative of a picked up image from a camera through a mobile communication network;
- data receiving step of receiving the image data transmitted from the camera through the mobile communication network, at a particular telephone number;
- caller ID obtaining step of obtaining identification of a caller transmitting the image data;
- image printing step of performing printing for reproducing an image on the basis of the received image data;
- delivery destination information obtaining step of obtaining information of delivery destination, to which a printed product is to be delivered, on the basis of the caller identification; and
- shipping step of shipping the printed product to the delivery destination based on the delivery destination information.

With the inventions set forth above, the image data transmitted from the camera through the mobile communication network can be printed in the photograph printing step. Also, the information of the delivery destination, such as address and name of addressee for delivering the printed product, is obtained in the delivery destination in formation obtaining step. Then, shipping of the printed product is performed in the shipping step. Therefore, user of the camera can receive the printed photographs without visiting a printing service shop. Also, since the image data can be transmitted directly from the camera, it avoids necessity of the external equipments, such as personal computer or the like. Furthermore, since the delivery destination information can be obtained utilizing the caller ID service, it is not necessary to transmit the caller information from the camera.

Thus, according to the present invention, the user of the camera may obtain high quality printed image without visiting the printing service shop. Also, since the image data can be transmitted directly from the camera to the printing service system, it becomes possible to avoid necessity of use of external equipments, such as the personal computer to reduce burden of the user in operation. Furthermore, the user may order image printing even when the image is picked up on the visiting site, such as on the destination of trip. Furthermore, since the caller information is obtained utilizing the caller ID service provided in the communication network on the side of the printing service system, the camera is not required to contain the caller information in the transmission data to contribute for reduction of the transmission data amount and simplification of the transmission data structure. Furthermore, the user information can be hidden even if the transmission data is tapped.

In the inventions set forth above, shipping step may include an address label printing step of printing address and addressee of the delivery destination on the basis of the delivery destination information.

On the other hand, the photograph printing and delivering method may further comprise printing fee collecting step of automatically collecting printing fee corresponding to amount of printing load for printing the image based on the image data, in which collection of the printing fee is performed using a fee collection service provided by the mobile communication network. In this case, the automatic printing fee collection may be performed by adding on a fee depending upon data transmission amount or data transmission time reflecting the amount of printing load, to a communication service fee of the mobile communication network.

In the construction set forth above, since the fee for printing can be charged by the communication common carrier of the mobile communication network as fees depending upon the data transmission amount or data transmission time added on the communication service fee, the printing service provider can certainly collect the printing fee.

In the preferred construction, the caller identification is obtained through a caller ID service provided by the mobile communication service.

In the preferred construction, the photograph printing and delivering method is implemented with employing a camera comprising:

a digital camera for picking up an image of an object and generating an image data representative of the picked up image, the digital camera including an image storage for storing the image data;

a memory storing the particular telephone number to access for transmitting the image data; and image data transmitter for calling to the particular telephone number as callee and transmitting the image data stored in the image storage through the mobile communication network.

The camera may further comprise a transmission button for activating the image data transmitter upon depression thereof. In the alternative, the image data transmitter may be responsive to number of the picked up image reaching a predetermined value for automatically performing image data transmitting operation.

According to the third aspect of the present invention, a photograph printing and delivering system comprises:

a data receiver for receiving an image data transmitted from a camera through a mobile communication network;

a caller ID obtaining part for obtaining identification of a caller transmitting the image data;

an image printer for performing printing for reproducing an image on the basis of the received image data;

a delivery destination information obtaining part for obtaining information of delivery destination, to which a printed product is to be delivered, on the basis of the caller identification; and a shipping part for shipping the printed product to the delivery destination based on the delivery destination information.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
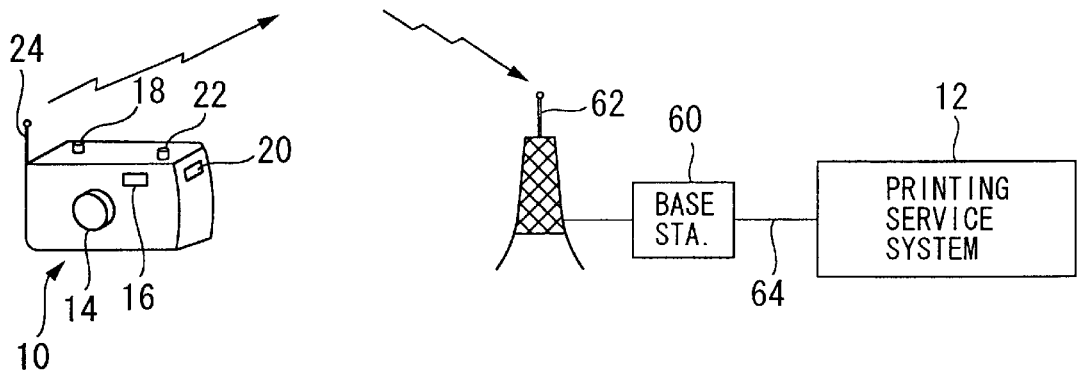
FIG. 1 is a schematic illustration showing one embodiment of a photograph printing and delivering system according to the present invention.

FIG. 1 is a schematic illustration showing a general construction of one embodiment of a photograph printing and delivering system according to the present invention. The shown embodiment of the photograph printing and delivering system includes a digital camera 10 having a data communication function and a printing service system 12 receiving an image data transmitted from the digital camera and performing an image printing process.

The digital camera 10 is provided with the data communication function through a cellular phone communication network or Personal Handyphone System (PHS: available in Japan) or the like. Namely, as shown in FIG. 1, the digital camera 10 has typical digital camera components including a lens 14, a finder 16, a shutter button 18, a message display portion 20 and so on. In addition, the digital camera 10 has a transmission button 22 and an antenna 24. As will be discussed later, when the transmission button 22 is depressed, picked up image data is transmitted from the antenna 24. It should be noted that the user of the digital camera 10 should have an established service contract with communication common carrier (or mobile communication common carrier) providing cellular phone communication service, personal handyphone system (PHS) service or so forth. Thus, user information, such as user address, user name and so forth and telephone number of the digital camera 10 are registered in the communication common carrier.

Figure 2:
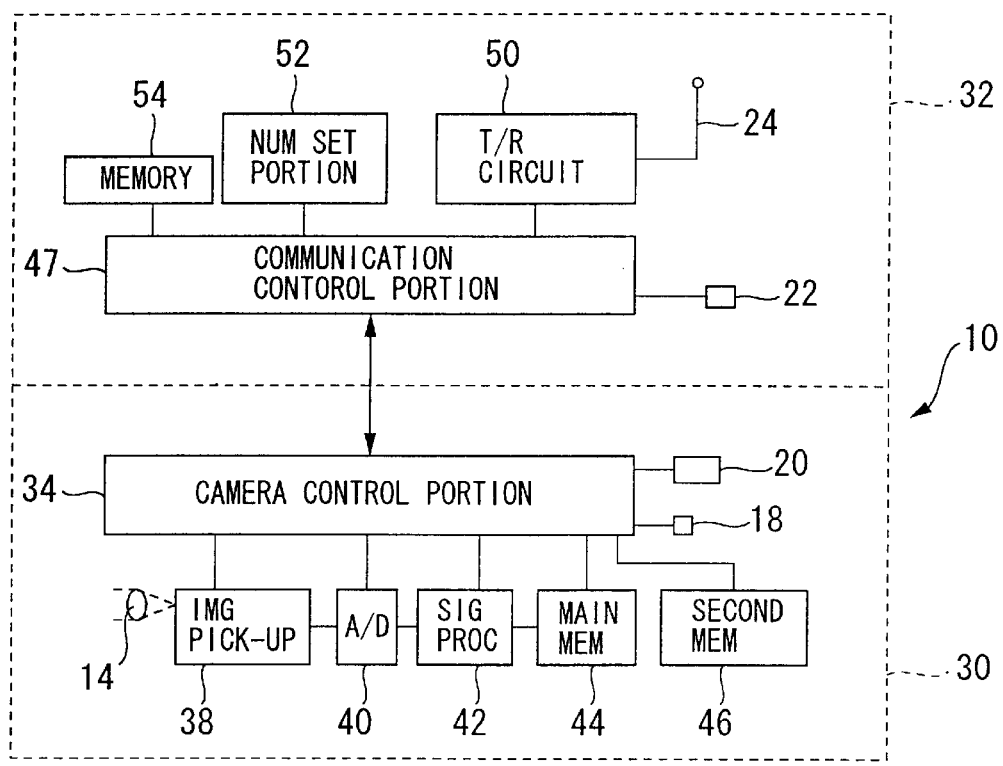
FIG. 2 is a schematic block diagram of a digital camera to be employed in one embodiment of the photograph printing and delivering system according to the present invention.

FIG. 2 is a schematic block diagram of the digital camera 10. As shown in FIG. 2, the digital camera 10 is constructed with a camera portion 30 and a mobile telephone portion 32.

The camera portion 30 has a construction the same as a known digital camera and is controlled by a camera control portion 34. To the camera control portion 34, the shutter button 18, the message display portion 20, an image pick-up element (e.g. CCD) 38, an A/D converter 40, a signal processing portion 42, a main image memory 44 and a second image memory 46 are connected. The lens 14 forms an image of an object on the image pick-up element 38 (e.g. CCD). The image pick-up element 38 supplies an analog signal corresponding to the image of the object formed thereon to the A/D converter 40. The A/D converter 40 converts the analog signal supplied from the image pick-up element 38 into a digital signal for supplying the signal processing portion 42. The signal processing portion 42 performs various signal processing, such as white balance, gamma correction or so forth. The image data from the signal processing portion 42 is recorded in the main image memory 44. When the shutter button 18 is depressed completely, the image data recorded in the image memory 44 is recorded in the second image memory 46 (for example, smart memory, memory card or so forth) in compressed form according to standardized compression format, such as JPEG or so forth. On the other hand, on the message display portion 20, number of images recorded in the second image memory 46 or various other information may be displayed.

On the other hand, the mobile telephone portion 32 has a construction, in which the known cellular telephone (or PHS) specialized for data transmission and reception is provided, and is controlled by a communication control portion 47. The communication control portion 47 and the camera control portion 34 are connected for mutual communication. In the communication control portion 47, the transmission button 22, a transmission and reception circuit 50, a number setting portion 52 and a non-volatile memory 54 are connected. The number setting portion 52 is constructed with ten key, for example, and permits setting of telephone number of the printing service system 12 as destination of data transmission. The telephone number set in the number setting portion 52 is stored in the non-volatile memory 54. Therefore, once the telephone number is set through the number setting portion 53, the set telephone number can be maintained even while a power source of the digital camera 10 is turned OFF. Accordingly, by initially setting the telephone number of the printing service system 12, the user of the digital camera 10 may not be required to set the telephone number through the number setting portion 52 again, unless the telephone number of the printing service system 12 is changed.

When the transmission button 22 is depressed, the transmission and reception circuit 50 receives the image data recorded in the second image memory 46 from the camera control portion 34, and transmits the image data with superimposing on a carrier wave of a predetermined frequency from the antenna 24. Upon depression of the transmission button 22, all of the image data stored in the second image memory 46 may be transmitted. In the alternative, the user may selectively transmit one or some of the image data in the second image memory 46 by depression of the transmission button 22.

On the other hand, if data is transmitted designating the digital camera 10 as callee, the signal is received by the transmission and reception circuit 50 via the antenna 24 and is supplied to the communication control portion 47. The message contained in the received signal is supplied to the camera control portion 34 and is displayed on the message display portion 20.

As shown in FIG. 1, the image data transmitted from the antenna 24 of the digital camera 10 is received by the antenna of a base station 50 of the mobile communication common carrier, and then is transmitted to the printing service system 12 via a ground telephone circuit 64.

It should be noted that transmission and reception of data between the digital camera 10 and the printing service system 12 is performed according to a protocol preliminarily established therebetween. On the other hand, as compression format and resolution of the image data, those preliminarily established between the printing service system 12 and the digital camera 10 may be used. In the alternative, it is also possible to make judgment for the compression format and resolution on the side of the printing service system 12.

In the shown embodiment, a service provider holding the printing service system 12 (hereinafter referred to as "printing service provider") should has established contracts with the mobile communication common carrier for caller ID and fee collection service.

The caller ID service is adapted for automatically notifying information relating to a caller (such as telephone number of the caller terminal) to a callee terminal. For the contractor of caller ID service, information of user address, name and so forth (here in after referred to as "user information") corresponding to the telephone number of each mobile telephone is preliminarily provided from the communication common carrier. By this caller ID service, the printing service system 12 may identify user information of the user of the digital camera which is the source of the image data.

On the other hand, the fee collection service is a service in which the mobile communication common carrier collects fee depending upon data transmission amount and data transmission period to the contractor of the service from the sender of the data on be half of the contractor. In the fee collection service, for data transmission from the digital camera to the printing service system, fee depending upon data transmission amount or transmission period (namely depending upon number of images to be printed) is charged by the mobile communication common carrier to the user of the digital camera 10, and the fee collected from the user is paid to the printing service provider from the mobile communication common carrier.

Figure 3:
FIG. 3 is an illustration showing a data format to be transmitted from the digital camera to a printing service system.

FIG. 3 shows a format of data to be transmitted from the digital camera 10 to the printing service system 12. As shown in FIG. 3, the transmission data is consisted of a compressed data of one or more images bounded by bound symbols S, and an end of data symbol EOD added to the end of the transmission data.

Next, discussion will be given for the construction of the printing service system 12 and the process content in the printing service system 12.

Figure 4:
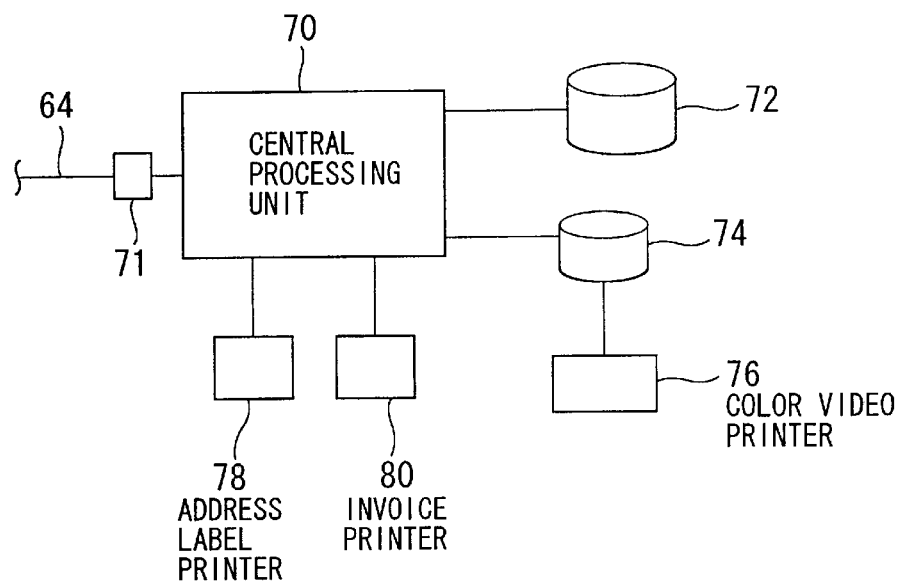
FIG. 4 is a schematic block diagram showing a construction of a printing service system.

FIG. 4 is a schematic block diagram of the printing service system 12. As shown in FIG. 4, the printing service system 12 includes a central processing unit 70, a user information database 72 connected to the central processing unit 70 and a printing data buffer 74. The central processing unit 70 is connected to the ground telephone circuit 64 via a data exchange unit 71. A color video printer 76 is connected to the printing data buffer 74. The color video printer 76 is a high quality color printer of any type, such as a silver salt type, laser type, sublimation type or so forth. On the other hand, an address label printer 78 and an invoice printer 80 are connected to the central processing unit 70.

In the user information database 72, terminal telephone number and user information of respective terminals provided by the mobile communication common carrier are registered. On the other hand, in the printing data buffer 74, image data to be printed by the color video printer 76 is stored as queue.

Figure 5:
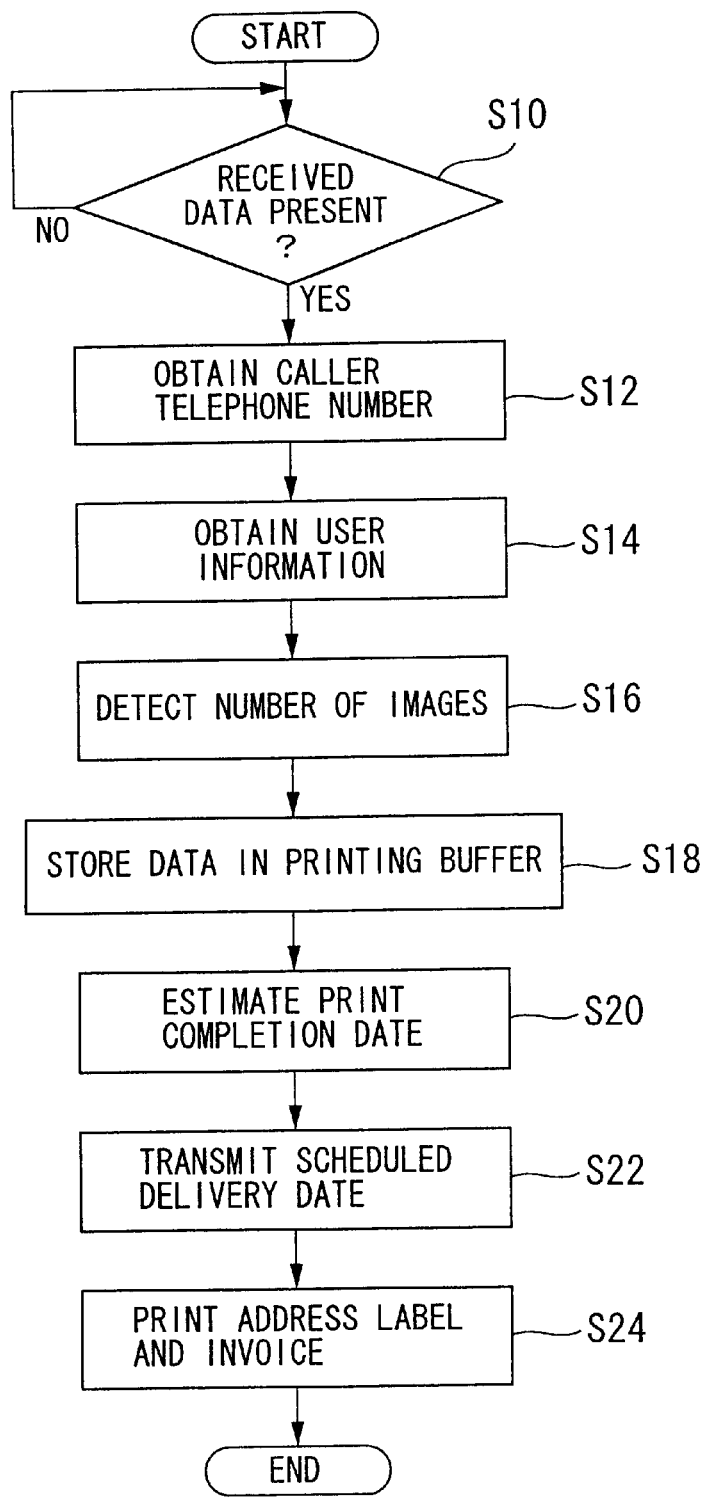
FIG. 5 is a flowchart showing a process content to be executed by a central processing unit of the printing service system.

FIG. 5 is a flowchart showing the process to be executed by the central processing unit 70 of the printing service system 12. As shown in FIG. 5, the central processing unit 70 makes judgment whether the received data is present or not (S10). If the received data is present, data of the caller telephone number is obtained (S12). Then, with reference to the user information database 72, the user information is obtained from the obtained caller telephone number (S14). Next, number N of images contained in the received data is detected (S16) and N in number of image data is applied to the printing data buffer 74 together with the user information of the caller (S18). It should be noted that the timing to perform decompression process of the compressed image data may be a timing upon application of data to the printing data buffer 74 and upon taking out of data. The image data in the printing data buffer 74 is sequentially supplied to the color video printer 76 and printed therein. At this time, on the back surface of the printed product, on which the image is printed, a sign identifying the user who transmitted the corresponding image data is printed.

On the other hand, the central processing unit 70 expects print completion date and time on the basis of the image data amount in the printing data buffer 74 and the printing speed of the color video printer 76 (S20). Then, a scheduled delivery date derived by adding a delivery period to the expected print completion date is transmitted to the digital camera 10 (S22). By this, in the digital camera 10, after transmission of the image data, delivery date of the printed products can be displayed on the message display portion 20.

Furthermore, the central processing unit 70 performs printing of the user address and name or so forth on an address label and an invoice respectively by an address label printer 78 and an invoice printer 80. It should be noted that in addition to the address and name, number of delivered products (namely, number of printed images) is also printed on the invoice. Personnel acting on preparation for delivery puts the printed products in an envelop for delivery together with the invoice to the corresponding user with reference to the user identification information printed on the back surface of the printed products, and fits the corresponding address label.

It should be noted that the foregoing operation to be performed by the personnel for preparation for delivery may be automated by a machine. Also, by using outlook window envelop and making the address and name on the invoice externally visible, the address label may be omitted. Furthermore, in the case where external delivery service is used for delivery of the printed products, the address and name of destination of delivery may be noticed to the management server of the delivery service, instead of printing the address label.

As set forth above, with the shown embodiment, when the transmission button 22 of the digital camera 10 is depressed, the picked up image data is transmitted to the printing service system 12 and printed by the color video printer 76. Then, the printed products on which the images are printed, are delivered to the user. Therefore, the user of the digital camera 10 can obtain high quality printed photographs without visiting the service shop. By this, for example, the images picked up on the traveling are transmitted to the printing service system 12 on site and the printed products can be received as returned to the home. Additionally, since the data transmission can be performed by pushing the transmission button 22 of the digital camera 10, process to input the image data to the personal computer or the like and then perform data transmission can be omitted. Therefore, even for the user not familiar in handling machine may smoothly perform data transmission with little attention to do so. Namely, by operating the digital camera in substantially the same operation feeling as normal camera, the printed image can be obtained in the home.

Furthermore, since the user information including the user name and user address can be obtained automatically by the printing service system 12 using the caller ID service, the user information is not required to be contained in the transmission data from the digital camera. Therefore, as shown in FIG. 3, only image data is contained in the transmission data to permit reduction of transmission data amount, and to simplify transmission data construction. Additionally, even if the transmission data is tapped, since the information of the data transmitter is not included in the transmission data, the data transmitter is not exposed to tapping person.

On the other hand, when the user in formation is transmitted together with the image data and the person who transmitted the image data is identified by the transmitted user information, a possibility cannot be avoided that the person transmitting data transmits false user data to pass off as other person unless measure, such as preliminarily registering each user and setting password for each user. In contrast to this, in the shown embodiment, since the caller is identified by using the telephone number as unique information of the digital camera 10. Therefore, it can prevent the caller transmitting data from passing off as other.

Furthermore, as set forth above, in the shown embodiment, by utilizing the fee collecting service, the fee for printing the photographs is collected from the user with clapping on the communication service fee by the communication common carrier, and then paid to the printing service provider. Therefore, the printing service provider is not required any attention for collecting the fees and collection of the fee can be assured. It should be also, collection of the printing fee may also be done by pay on arrival delivery service, for example, instead of the fee collecting service of the communication common carrier.

In the shown embodiment, the camera portion 30 and the mobile telephone portion 32 are integrated in the digital camera. However, the invention is not specific construction as disclosed, and instead, the camera portion 30 and the mobile telephone portion can be provided separately so that these portions may be detachably connected through connector or so forth.

Additionally, while the shown embodiment performs transmission of the image data from the digital camera 10 upon depression of the transmission button 22, manner of transmitting the image data is not limited the specified manner. For instance, it is also possible to automatically initiate transmission when number of picked-up image reaches a predetermined number.

Furthermore, while the shown embodiment has been discussed under the premise that the image data is to be always transmitted to the fixed printing service system 12. However, it is also possible to provide a plurality of printing service systems performing printing in mutually different paper sizes, and providing mutually distinct telephone numbers for respective printing service systems, and a selection switch on the digital camera 10 for selecting the desired size of the image to be printed so that one of the printing service systems adapted for printing in the designated size is selected for transmitting the image data to the selected printing service system.

Additionally, in the shown embodiment, the caller ID is transmitted to the printing service system by the caller ID service, and the user information, such as address, name and so forth, is obtained with reference to the user information database 72. However, the manner of the caller ID service is not limited to those set forth above. For instance, information of name, address and so forth may be notified from the communication common carrier in addition to the telephone number. In the latter case, the user information database 72 in the printing service system 12 becomes unnecessary.

What is claimed is:

1. A photograph printing and delivering method comprising:

data receiving step of receiving an image data transmitted from a camera through a mobile communication network;

caller ID obtaining step of obtaining identification of a caller transmitting said image data, wherein said caller identification is obtained through a caller ID service provided by a mobile communication service of the mobile communication network;

image printing step of performing printing for reproducing an image on the basis of the received image data;

delivery destination information obtaining step of obtaining information of delivery destination, to which a printed product is to be delivered, on the basis of said caller identification; and shipping step of shipping said printed product to said delivery destination based on said delivery destination information.

2. A photograph printing and delivering method as set forth in claim 1, wherein said shipping step includes an address label printing step of printing address and addressee of the delivery destination on the basis of said delivery destination information.

3. A photograph printing and delivering method as set forth in claim 1, which further comprises printing fee collecting step of automatically collecting printing fee corresponding to amount of printing load for printing the image based on said image data, in which collection of the printing fee is performed using a fee collection service provided by said mobile communication network.

4. A photograph printing and delivering method as set forth in claim 3, wherein automatic printing fee collection is performed by adding on a fee depending upon data transmission amount or data transmission time reflecting the amount of printing load, to a communication service fee of said mobile communication network.

5. The photograph printing and delivering method as set forth in claim 1, further comprising picking up an image of an object and generating an image data representative of the picked image, wherein the picking up step comprises picking up plural images, and said calling step comprises automatically performing the image data transmitting operation when a number of the picked up image reaches a predetermined value.

6. A photograph printing and delivering system comprising:

a data receiver for receiving an image data transmitted from a camera through a mobile communication network;

a caller ID obtaining part for obtaining identification of a caller transmitting said image data, wherein said caller identification is obtained through a caller ID service provided by a mobile communication service of the mobile communication network;

an image printer for performing printing for reproducing an image on the basis of the received image data;

a delivery destination information obtaining part for obtaining information of delivery destination, to which a printed product is to be delivered, on the basis of said caller identification; and a shipping part for shipping said printed product to said delivery destination based on said delivery destination information.

7. A photograph printing and delivering system as set forth in claim 6, wherein said shipping part includes an address label printer for printing address and addressee of the delivery destination on the basis of said delivery destination information.

8. A photograph printing and delivering system as set forth in claim 6, which further comprises a printing fee collecting part for automatically collecting printing fee corresponding to amount of printing load for printing the image based on said image data, in which collection of the printing fee is performed using a fee collection service provided by said mobile communication network.

9. A photograph printing and delivering system as set forth in claim 8, wherein automatic printing fee collection is performed by adding on a fee depending upon data transmission amount or data transmission time reflecting the amount of printing load, to a communication service fee of said mobile communication network.

* * * * *